United States Patent [19]
Chao et al.

[11] Patent Number: 6,147,161
[45] Date of Patent: Nov. 14, 2000

[54] COMPOSITION AND METHOD FOR ENHANCING THE SURFACE ADHESION OF POLYURETHANE FOAM TO SURFACES OF THERMOPLASTIC BLENDS

[75] Inventors: Herbert Shin-I Chao, Schenectady; Geoffrey Henry Riding, Castleton; David John Swanson, Stuyvesant Falls, all of N.Y.

[73] Assignee: General Electric Company, Schenectady, N.Y.

[21] Appl. No.: 09/287,238

[22] Filed: Apr. 6, 1999

Related U.S. Application Data

[60] Continuation-in-part of application No. 09/013,231, Jan. 26, 1998, abandoned, which is a division of application No. 08/769,358, Dec. 19, 1996, Pat. No. 5,756,196.

[51] Int. Cl.[7] ....................................................... C08L 71/12
[52] U.S. Cl. .......................... 525/132; 524/127; 524/508; 525/66; 525/92 D; 525/133
[58] Field of Search ................................................ 525/132

[56] References Cited

U.S. PATENT DOCUMENTS

| Re. 355,009 | 5/1997 | Fujii et al. | 525/397 |
| 4,873,286 | 10/1989 | Gallucci et al. | 525/92 |

*Primary Examiner*—Ana Woodward
*Attorney, Agent, or Firm*—S. Bruce Brown; Donald S. Ingraham

[57] ABSTRACT

A composition and method for promoting improved adhesion between a thermoplastic resinous substrate and polyurethane foam is provided. In one aspect of this invention, the composition comprises a thermoplastic mixture of at least one polyphenylene ether and at least one poly (alkenylaromatic) compound; and at least one primary amine-containing material or secondary amine-containing material.

11 Claims, No Drawings

COMPOSITION AND METHOD FOR ENHANCING THE SURFACE ADHESION OF POLYURETHANE FOAM TO SURFACES OF THERMOPLASTIC BLENDS

This application is a continuation-in-part of U.S. application Ser. No. 09/013,231, filed Jan. 26, 1998, now abandoned, which is a division of Ser. No. 08/769,358 filed Dec. 19, 1996 is now U.S. Pat. No. 5,756,196, issued May 26, 1998, which is incorporated herein by reference.

BACKGROUND OF THE INVENTION

This invention relates to novel compositions of thermoplastic blends of polyphenylene ethers and poly(alkenylaromatic) compounds that improve adhesion with polyurethane foam. More particularly, the invention relates to substrate compositions containing polyphenylene ether resins and primary or secondary amine-containing materials. It also relates to a method for promoting the adhesion of polyurethane foam to the surfaces of said substrate compositions. The invention is further related to resinous articles with foam inserts.

Thermoplastic resins have become of interest in recent years as a replacement for metal in the interior parts of automobiles, such as the manufacture of instrument panels, top covers and arm rests in the interior of the car. In these applications one requirement of the plastic resin is that it must adhere to polyurethane foam. Currently, there are plastic products available that are in use for these applications. However, there is a need for improved properties of the plastics and improved adhesion of the plastic with the polyurethane foam.

One such product that has potential for use in the automotive industry is a General Electric Company product called "Noryl". Noryl® is a registered Trademark for the resinous mixture of polyphenylene ether and poly(alkenylaromatic) compound. Noryl is a good choice for automotive applications because of its high impact strength, flame retardant properties, low cost and dimensional stability. The successful application of Noryl for automotive interior components requires excellent adhesion performance with polyurethane foam. Previously, a resinous mixture of 38 parts by weight polyphenylene ether with 62 parts by weight polystyrene has shown little or no adhesion with polyurethane foam. Thus, there is a need to have a Noryl composition utilizing the properties of the thermoplastic resin mixture that will also provide improved adhesion with polyurethane foam.

SUMMARY OF THE INVENTION

Accordingly, this invention provides a composition and method for promoting improved adhesion between a thermoplastic resinous substrate and polyurethane foam. In one aspect of this invention, the composition comprises a thermoplastic mixture of at least one polyphenylene ether and at least one poly(alkenylaromatic) compound; and at least one primary amine-containing material or secondary amine-containing material. By primary amine-containing material is meant a material having one or more —$NH_2$ groups. Examples of such materials include, but are not limited to, cyclohexylamine and 1-hexadecylamine. Further, the primary amine-containing material can be a poly[oxy(methyl-1,2-ethanediyl)]-α-hydro-ω-(2-aminomethyl-ethoxy)ether with 2-ethyl-2-(hydroxymethyl)-1,3-propanediol in a ratio of 3:1, commercially available as Jeffamine® T-403. By secondary amine-containing material is meant a material containing at least one $R_2NH$ moiety where R is any alkyl or aryl group. A class of secondary amine-containing materials would be polyethylenimines. Additional examples of such materials include, but are not limited to, diethylamine and dipropylamine.

Another aspect of the invention is an article comprising a resinous thermoplastic substrate and a layer of polyurethane foam on a surface of said substrate, wherein the substrate comprises a thermoplastic mixture of at least one polyphenylene ether and at least one poly(alkenylaromatic) compound; and at least one primary amine-containing material or secondary amine-containing material.

Still another aspect of the invention is a method for improving the adhesion of polyurethane foam to a resinous thermoplastic substrate comprising the steps of: forming a resinous substrate containing a thermoplastic mixture of at least one polyphenylene ether and at least one poly(alkenylaromatic) compound with at least one primary amine-containing material or secondary amine-containing material; placing the resinous thermoplastic substrate in a foaming mold shell; pouring a homogeneous foaming mixture into the foaming mold on the substrate; and removing the mold shell after a sufficient amount of time to cure the foam layer adhering to the substrate.

It is an object of this invention to provide a composition for a thermoplastic resin that is capable of providing enhanced adhesion between polyurethane foam and resinous thermoplastic substrates.

It is another object of this invention to provide an article containing a resinous thermoplastic substrate with an adhering polyurethane foam layer.

It is a further object of the invention to provide a method for making the article consisting of a resinous thermoplastic substrate with the foam layer. Also in accordance with this invention, there is provided a thermoplastic article of manufacture that could be used as an automotive instrument panel. A thermoplastic substrate used in the instrument panel is treated with polyurethane foam, exhibiting excellent adhesion between the polyurethane foam and the substrate material.

DESCRIPTION OF THE INVENTION

As noted above, the principal components of the inventive composition that will yield a resinous thermoplastic substrate with enhanced adhesion to polyurethane foam are: a thermoplastic mixture or blend of at least one polyphenylene ether and at least one poly(alkenylaromatic) compound and at least one primary amine-containing material or secondary amine-containing material. Other compounds can be present in the composition such as flame retardants, impact modifiers, mold releases, antioxidants, stabilizers, and mixtures thereof. The amount of polyphenylene ether in the polyphenylene ether-poly(alkenylaromatic) compound mixture is at least about 20 parts by weight based on a total of 100 parts. The preferred amount is about 30–50 parts by weight. The amount of at least one poly(alkenylaromatic) compound in the polyphenylene ether-poly(alkenylaromatic) compound mixture is at least about 20 parts by weight based on a total of 100 parts.

Representative examples of polyphenylene ethers are known polymers comprising a plurality of structural units of the formula

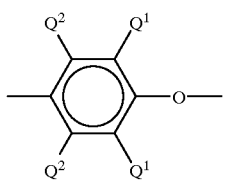

wherein in each of said units independently, each $Q^1$ is independently halogen, primary or secondary lower alkyl (i.e., alkyl containing up to seven carbon atoms), phenyl, haloalkyl, aminoalkyl, hydrocarbonoxy, or halohydrocarbonoxy, wherein at least two carbon atoms separate the halogen and the oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$-alkyl, and each $Q^2$ is hydrogen.

Both homopolymer and copolymer polyphenylene ethers are included. The preferred homopolymers are those containing 2,6-dimethyl-1,4-phenylene ether units. Suitable copolymers include random copolymers containing such units in combination with, for example, 2,3,6-trimethyl-1, 4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals, undergo reaction in known manner with the hydroxy groups of polyphenylene ether chains to produce a higher molecular weight polymer.

The polyphenylene ether generally has a number average molecular weight within the range of about 3,000–40,000 and a weight average molecular weight within the range of about 20,000–80,000, as determined, by gel permeation chromatography. Its intrinsic viscosity (i.v.) is most often in the range of about 0.15–0.6 dl./g., as measured in chloroform at 25° C.

The polyphenylene ethers are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as copper, manganese, or cobalt compound, usually in combination with various other materials.

Particularly useful polyphenylene ethers for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

The poly(alkenylaromatic) compounds employed in the thermoplastic resinous substrate composition include homopolymers and copolymers of such compounds as styrene, α-methylstyrene, 4-methylstyrene and dibromostyrene. Styrene is generally preferred. Particularly preferred are conventional rubber-modified polystyrenes, sometimes designated "high impact polystyrene" or "HIPS".

While polyphenylene ether and poly(alkenylaromatic) compound blends containing any proportion of the two resins may be employed in the invention, it is preferred that the polyphenylene ether be present in amounts of at least about 20% by weight and preferably at least about 30–50% by weight, based on the two polymers. Most preferable is about 40% by weight, based on the two polymers. The at least one poly(alkenylaromatic) compound is present in an amount of at least about 20% by weight, based on the two polymers, and preferably in an amount of about 20–80% by weight, and most preferably in an amount of about 50% by weight.

The polyphenylene ether and poly(alkenylaromatic) compound mixture or blend may also contain conventional additives, especially flame retardant additives and impact modifiers. Flame retardant additives include brominated polystyrenes and phosphorus-containing chemicals such as triphenylphosphate, tri-t-butyl-phenylphosphate, tetraphenyl resorcinol bisphosphate, tetraxylyl resorcinol bisphosphate, tetraphenylhydroquinone bisphosphate and tetraxylyl hydroquinone bisphosphate. Impact modifiers for polyphenylene ether-poly(alkenylaromatic) compound mixtures or blends are known. They include diblock and triblock copolymers of alkenylaromatic compounds such as styrene and aliphatic dienes such as butadiene and isoprene. The diene-derived blocks in said copolymers may be substantially saturated or may possess substantial unsaturation. One or more impact modifiers can be used. The composition may also include mold release compounds such as polyethylene.

Also as noted above, another principal ingredient in the composition is a primary amine-containing material or secondary amine-containing material. One such material is commercially known as Jeffamine T-403, which is a poly [oxy(methyl-1,2-ethanediyl)]-α-hydro-ω-(2-aminomethylethoxy)ether with 2-ethyl-2-(hydroxymethyl)-1,3-propanediol in a ratio of 3:1 as shown in the formula below. Typically, the sum of x+y+z in the formula is about 5–6.

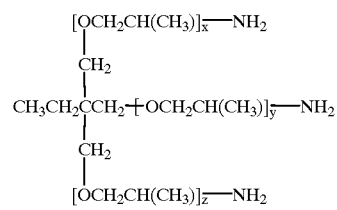

It was found that as little as about two (2) weight percent of Jeffamine in the inventive composition improves the adhesion of a foam blend to the thermoplastic resinous substrate. The primary amine-containing material may be present in the range of about 2 to 20 weight percent of the total composition. About eight to 20 weight percent of a primary amine-containing material, such as Jeffamine T-403, is a preferred range.

Also included as an additive applicable to this invention are secondary amine-containing materials such as polyethylenimines, and dialkylamines such as, but not limited to, diethylamine and dipropylamine. The secondary amine-containing material may be present in the range of about 2 to 20 weight percent of the total composition. About 8 to 20 weight percent of a secondary amine in the inventive formulation is a preferred range.

The addition of more than one amine-containing material may further enhance the adhesion of polyurethane foam to the resinous thermoplastic substrate. Also, the addition of a phenolic additive may further enhance the adhesion of polyurethane foam to the resinous thermoplastic substrate. For instance, the addition of a second additive such as Nirez™ 2150, which is a terpenephenol made by reacting limonene and phenol, was found to increase the adhesive performance between the resinous thermoplastic substrate and the polyurethane foam.

Further understanding of the present invention may be had from the following examples and comparative examples which are intended to illustrate, but not limit, the invention.

EXAMPLES

Example 1

Three blends containing polyphenylene ether and poly (alkenylaromatic) compound were made and tested for foam adhesion. Table I shows the compositions in Plaques 1–3 and the physical appearance as well as the results from foam adhesion testing.

TABLE I

|  | Plaque 1 | Plaque 2 | Plaque 3 |
|---|---|---|---|
| PPE (0.46 i.v.)[1] | 38 | 40 | 40 |
| Novacor 2272[2] | 62 | 60 | 60 |
| Jeffamine T-403[3] |  | 2 | 8 |
| Plaque Appearance |  | transp | transp |
| Foam Adhesion | X* | ±§ | E¶ | transp: transparent; X*: no adhesion; ±§: marginal adhesion; E¶: excellent
[1]PPE (0.46 i.v.) - polyphenylene ether
[2]Novacor 2272 - polystyrene.
[3]Jeffamine T-403 - primary amine-containing material.

Plaque 1 represents the standard Noryl formulation and is used as the control model without the amine-containing additives. The control blend Plaque 1 contains only poly(2, 6-dimethyl-1,4-phenylene oxide) (PPE) and Novacor 2272, a polystyrene. This had very poor polyurethane foam adhesion. The foam in Plaque 1 separated from the substrate cohesively. Plaque 2 had 40 parts by weight polyphenylene ether and 60 parts by weight polystyrene plus 2 parts by weight Jeffamine T-403, which is a poly[oxy(methyl-1,2-ethanediyl)]-α-hydro-ω-(2-aminomethyl-ethoxy)ether with 2-ethyl-2 -(hydroxymethyl)-1,3-propanediol in a ratio of 3:1. The foam adhesion for Plaque 2 was significantly improved over Plaque 1. Some cohesive failure in the polyurethane foam took place during the peel test. Plaque 3 demonstrates the same composition as Plaque 2 except that about eight weight percent of Jeffamine T-403 is used in the Noryl formulation. Plaque 3 had excellent foam adhesion with the polyurethane foam. A complete cohesive failure occurred in the foam during the peel test in Plaque 3. It is further pointed out from Table I that the plaque appearance of Plaque 2 and Plaque 3 was transparent, which shows that the Jeffamine T-403 additive has excellent compatibility with the polyphenylene ether and polystyrene.

The foam procedure that was used to formulate the resinous article with a foam polyurethane layer to be tested for adhesion follows. A very light coat of the mold release was applied with a paper towel to all interior surfaces of the foaming mold. The plaques tested (composition shown in Tables I and II) were covered with a mesh screen and placed inside the mold. The plaques were held on the sides of the mold with a double-stick tape on their back surface. In a 1000 milliliter (ml) plastic disposable beaker, 308 grams of polyol UF1010B was weighed. In a separate 250 ml disposable beaker, 192 grams of polyisocyanate PAPI 4095 was added. Then, the polyisocyanate was poured into the polyol beaker, and the contents were mixed with overhead mechanical stirrer with a stirring speed of 5,000 rpm for 8 seconds. The homogeneous mixture was poured into the foaming mold immediately after mixing and a cover was placed on the mold, then it was fastened with two cover clamps. In about an hour the foamed plaques were removed from the mold by taking the mold apart.

The plaques with the polyurethane foam on the surface were then conditioned for 24 hours at room temperature. The samples were then cut into several 1 inch wide strips. The adhesion of the polyurethane foam to the plastic substrates that were covered with a mesh screen was assessed by pulling the foam apart from the substrate at 90° at a speed of 2.5 inches per minute. The locus of failure, whether cohesive or adhesive, and the force required for the failure were reported as noted in Table I.

Example 2

A fourth sample, Plaque 4, was made using a combination of Jeffamine and Nirez additives to improve the urethane foam adhesion. The composition of the improved Noryl formulation is shown in Table II.

TABLE II

|  | Plaque 4 |
|---|---|
| PPE (0.46 intrinsic viscosity)[1] | 45 |
| HIPS[2] | 55 |
| Nirez 2150[3] | 5 |
| Jeffamine T403[4] | 2 |
| Kraton G 1650[5] | 5 |
| SOL T6302[6] | 5 |
| Hostastat HS-1[7] | 2 |
| Polyethylene[8] | 1.5 |
| ZnS/ZnO[9] | 0.15/0.15 |

[1]PPE (0.46 intrinsic viscosity) - polyphenylene ether
[2]HIPS: high impact polystyrene
[3]Nirez 2150 - terpenephenol resin
[4]Jeffamine T-403 - primary amine-containing material
[5]Kraton ® G 1650: styrene-ethylene-butylene-styrene (SEBS) saturated rubber
[6]SOL T6302: styrene-butadiene unsaturated rubber
[7]Hostastat ® HS-1: Sodium $C_{12-20}$ alkanesulfonates
[8]Polyethylene - linear low density polyethylene
[9]ZnS/ZnO - zinc sulfide/zinc oxide powders The formulation shown in Plaque 4 was made employing both Jeffamine T-403 and Nirez 2150, terpenephenol made by reacting limonene and phenol. As anticipated, the formulation had excellent physical properties and foam adhesion. The foam test that was conducted was similar to that of Example 1. The foam adhesion between the Noryl resinous substrate and the polyurethane foam was excellent.

What is claimed:

1. A composition for a resinous thermoplastic substrate, wherein said substrate adheres to a foam surface, and wherein said composition comprises; a mixture of at least one polyphenylene ether and at least one poly (alkenylaromatic) compound; and at least one primary amine-containing material or secondary amine-containing material, wherein the primary amine-containing material is selected from the group consisting of cyclohexylamine, 1-hexadecylamine, and a poly[oxy(methyl-1,2-ethanediyl)]-α-hydro-ω-(2-aminomethylethoxy)ether with 2-ethyl-2-(hydroxymethyl)-1,3-propanediol in a ratio of 3:1 as in the formula

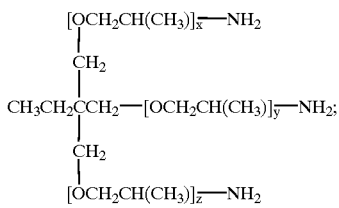

wherein the sum of x+y+z is about 5–6, and wherein the secondary amine-containing material is selected from the group consisting of diethylamine, dipropylamine, and polyethylenimines.

2. The composition according to claim 1 where the polyphenylene ether comprises a plurality of structural units of the formula

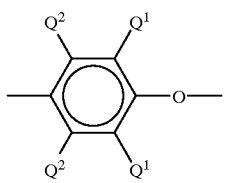

wherein in each of said units independently, each $Q^1$ is independently halogen, primary or secondary lower alkyl containing up to seven carbon atoms, phenyl, haloalkyl, aminoalkyl, hydrocarbonoxy, or halohydrocarbonoxy, wherein at least two carbon atoms separate the halogen and the oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. The composition according to claim 2 where the polyphenylene ether is a poly(2,6-dimethyl-1,4-phenylene ether).

4. The composition according to claim 1 where the poly(alkenylaromatic) compound is polystyrene.

5. The composition according to claim 1 where the primary amine-containing material is a poly[oxy(methyl-1,2-ethanediyl)]-α-hydro-ω-(2-aminomethylethoxy)ether with 2-ethyl-2-(hydroxymethyl)-1,3-propanediol in a ratio of 3:1 as in the formula

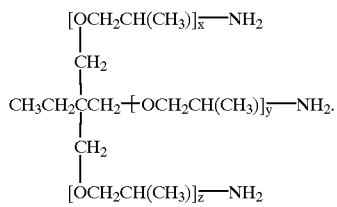

in which the sum of x+y+z is about 5–6.

6. The composition of claim 1, wherein the primary amine-containing material or secondary amine-containing material is present at a level in the range of about 2 weight percent to about 20 weight percent, based on the weight of the entire composition.

7. The composition of claim 6, wherein the primary amine-containing material or secondary amine-containing material is present at a level in the range of about 2 weight percent to about 8 weight percent, based on the weight of the entire composition.

8. The composition of claim 6, wherein the primary amine-containing material or secondary amine-containing material is present at a level in the range of about 8 weight percent to about 20 weight percent, based on the weight of the entire composition.

9. The composition of claim 1, wherein the polyphenylene ether is present in an amount of about 30% by weight to about 50% by weight, based on the weight of polyphenylene ether and poly(alkenylaromatic) compound.

10. The composition of claim 1, wherein the poly (alkenylaromatic) compound is present in an amount of about 20% by weight to about 80% by weight, based on the weight of polyphenylene ether and poly(alkenylaromatic) compound.

11. A composition for a resinous thermoplastic substrate, wherein said substrate adheres to a foam surface, and wherein said composition comprises a mixture of at least about 20% by weight of at least one poly(2,6-dimethyl-1,4-phenylene ether) and about 20–80% by weight of at least one polystyrene, both weights being based on the combined weight of the at least one poly(2,6-dimethyl-1,4-phenylene ether) and the at least one polystyrene; and 2–20% by weight of the total composition of a primary amine, wherein the primary amine consists of at least one poly[oxy(methyl-1,2-ethanediyl)]-α-hydro-ω-(2-aminomethylethoxy)ether with 2-ethyl-2-(hydroxymethyl)-1,3-propanediol in a ratio of 3:1 as in the formula

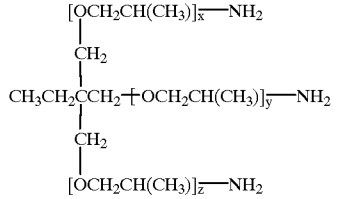

in which the sum of x+y+z is about 5–6.

* * * * *